(12) United States Patent
Baentsch et al.

(10) Patent No.: US 7,506,175 B2
(45) Date of Patent: Mar. 17, 2009

(54) FILE LANGUAGE VERIFICATION

(75) Inventors: Michael Baentsch, Langnau am Albis (CH); Thomas Eirich, Au (CH); Peter Buhler, Rueschlikon (CH); Frank Hoering, Zurich (CH); Marcus Oestreicher, Zurich (CH); Thomas D. Weigold, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1591 days.

(21) Appl. No.: 09/992,984

(22) Filed: Nov. 5, 2001

(65) Prior Publication Data
US 2002/0093856 A1 Jul. 18, 2002

(30) Foreign Application Priority Data
Nov. 6, 2000 (EP) .................................. 00124071

(51) Int. Cl.
*G06F 11/30* (2006.01)
(52) U.S. Cl. ....................... 713/187; 717/126; 713/193; 713/176
(58) Field of Classification Search ......... 713/187–189, 713/165, 164, 166, 167, 190, 192, 193, 176, 713/178; 717/124–126, 114, 117, 106–108, 717/139, 142–144, 118, 138, 148; 726/22–24, 726/26; 707/1; 718/1
See application file for complete search history.

(56) References Cited

U.S. PATENT DOCUMENTS

| | | | | |
|---|---|---|---|---|
| 6,052,530 A | * | 4/2000 | Buzbee et al. | 717/153 |
| 6,092,147 A | * | 7/2000 | Levy et al. | 711/6 |
| 6,272,641 B1 | * | 8/2001 | Ji | 726/24 |
| 6,324,685 B1 | * | 11/2001 | Balassanian | 717/118 |
| 6,349,344 B1 | * | 2/2002 | Sauntry et al. | 719/332 |
| 6,539,433 B1 | * | 3/2003 | Tominaga et al. | 709/246 |
| 6,581,206 B2 | * | 6/2003 | Chen | 717/143 |
| 6,751,675 B1 | * | 6/2004 | Chen | 709/250 |
| 6,880,155 B2 | * | 4/2005 | Schwabe et al. | 717/162 |
| 6,883,163 B1 | * | 4/2005 | Schwabe | 717/126 |
| 6,981,245 B1 | * | 12/2005 | Schwabe | 717/126 |
| 7,069,554 B1 | * | 6/2006 | Stammers et al. | 717/178 |
| 2003/0028686 A1 | * | 2/2003 | Schwabe et al. | 709/332 |
| 2004/0068726 A1 | * | 4/2004 | Levy et al. | 718/1 |

OTHER PUBLICATIONS

Sun Microsystems, JAVA Card 2.0 Application Programming Interfaces, Sun Microsystems, 1997 pp. 1-163.*
Sun Microsystems, JAVA Card Applet Developer's Guide, Sun Microsystems, Aug. 19, 1998.*
Sun Microsystems, JAVA Card 2.0 Programming Concepts, Sun Microsystems, Oct. 15, 1997, pp. 25.*

* cited by examiner

*Primary Examiner*—Kim Vu
*Assistant Examiner*—Nirav Patel
(74) *Attorney, Agent, or Firm*—Martin J. McKinley; Law Office of Jime Boice

(57) ABSTRACT

A technique for language verification of a Java® card CAP file is provided. The Java® card CAP file is converted from an original Java® code file while conserving its original Java® semantics. The Java® card CAP file is converted into a corresponding converted Java® code file that is semantically identical to the Java® card CAP file. In a language-verification step, the converted Java® code file is then verified if it has been found to comply with a predetermined language specification.

9 Claims, 1 Drawing Sheet

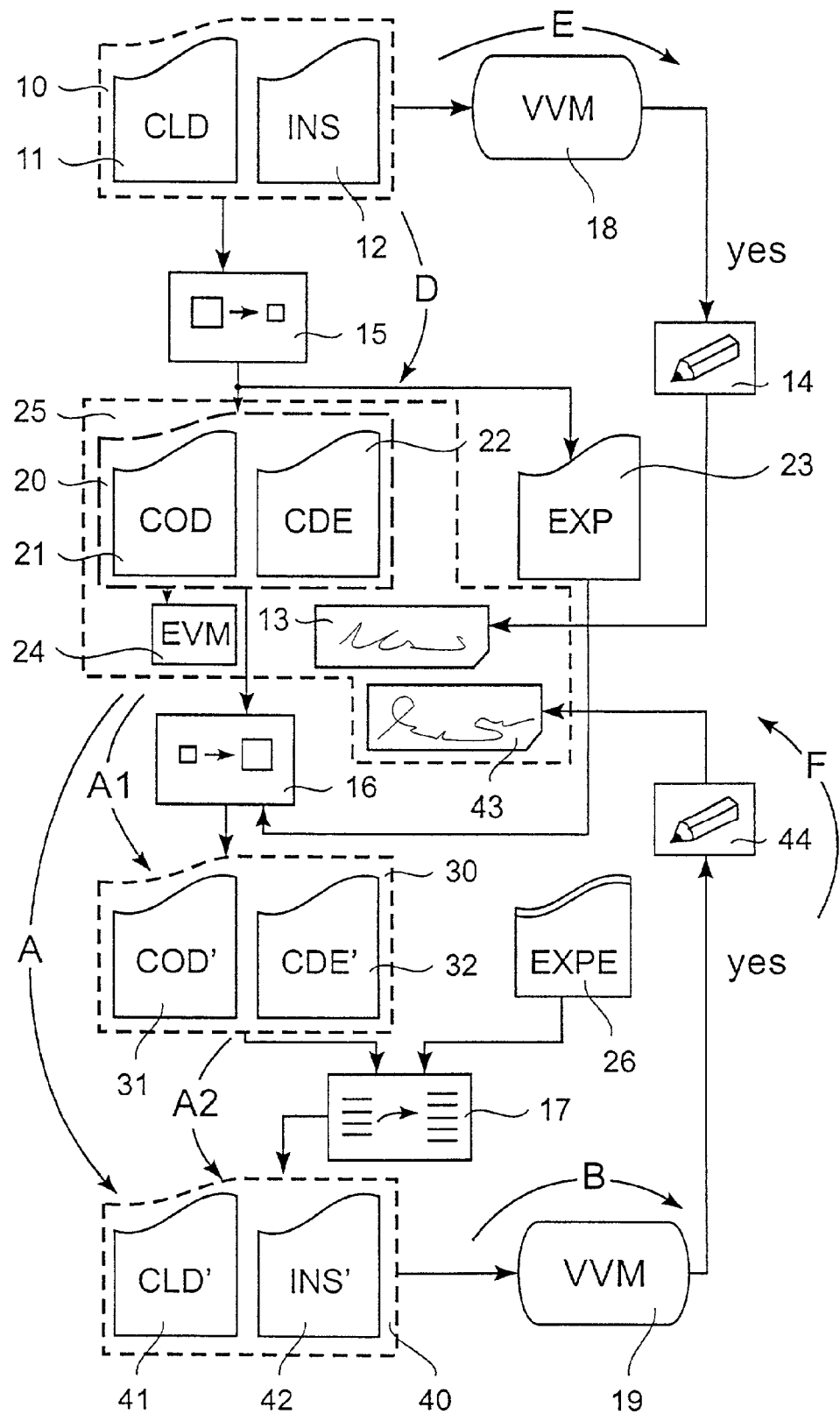

FILE LANGUAGE VERIFICATION

BACKGROUND OF THE INVENTION

1. Field of the Invention

The invention relates to a method to verify preprocessed Java® (Java® is a trademark or registered trademark of Sun Microsystems, Inc. in the United States and other countries) code. Essentially it comprises a conversion step after which language verification of non-preprocessed Java® code is utilized. In particular, a technical solution is suggested that allows for the conversion of preprocessed Java® card converted applet (hereinafter CAP) files back into standard Java® class files. This conversion can be achieved in a provably correct way, thus solving the problem of language verifying Java® card CAP files. The proposed concept is also applicable to preprocessed code in languages other than Java®.

2. Description of the Related Art

Java® is an interpreted language defined independently of any particular hardware environment which features high-level language operations. Therefore, Java® is extremely well suited for use in embedded microcontrollers. However, due to the size constraints in typical embedded systems, neither the full Java® language set, nor the complete execution and loading format as defined for Java® on PCs can be sustained in such embedded microcontroller devices. Therefore, it is a common technique to preprocess or convert the regular, PC-oriented Java® code, also called class files, into a format suitable for loading and execution on embedded microcontrollers. One concrete example where this has been firmly specified is in the area of the Java® card, a chip card featuring a subsetted Java® interpreter.

One goal of executing Java® code is to attain a level of security and trust that can not be achieved by using machine language programs alone. This is due to the interpreted nature of the language and the thus inherent continuous checks of the Java® code prior to its actual execution. One common feature providing this trust is a so-called Java® class verifier run at development time of the Java® code. It checks, for example, static object/class relationships as well as basic scoping rules, i.e., whether a particular method has access to another class's data or code. Programs to perform this work are available.

Java® card technology enables programs written in the Java® programming language to be run on chipcards, smart cards and other small, resource-constrained devices. Developers can build and test programs using standard software development tools and environments, then convert them into a form that can be installed onto a Java® card technology enabled device. Application software for the Java® card platform is called an applet, or more specifically, a Java® card applet or card applet (to distinguish it from browser applets). While Java® card technology enables programs written in the Java® programming language to run on chipcards, such small devices are far too underpowered to support the full functionality of the Java® platform. Therefore, the Java® card platform supports only a carefully chosen, customized subset of the features of the Java® platform. This subset provides features that are well-suited for writing programs for small devices and preserves the object-oriented capabilities of the Java® programming language. The role of the Java® card virtual machine is best understood in the context of the process for production and deployment of Java® card software. There are several components that make up a Java® card system, including the Java® card virtual machine, the Java® card converter, a terminal installation tool, and an installation program that runs on the device.

Development of a Java® card applet begins as with any other Java® program. A developer writes one or more Java® classes, and compiles the source code with a Java® compiler, producing one or more class files. The applet is run, tested and debugged on a workstation using simulation tools to emulate the device environment. Then, when an applet is ready to be downloaded to a device, the class files comprising the applet are converted to a Java® card CAP file, also called converted applet file, using a Java® card converter. The Java® card converter takes as input not only the class files to be converted, but also one or more export files. An export file contains name and link information for the contents of other packages that are imported by the classes being converted. When an applet or library package is converted, the converter can also produce an export file for that package.

After conversion, the Java® card CAP file is copied to a card terminal, such as a desktop computer with a card reader peripheral. Then an installation tool on the terminal loads the Java® card CAP file and transmits it to the Java® card technology enabled device. An installation program on the device receives the contents of the Java® card CAP file and prepares the applet to be run by the Java® card virtual machine. The virtual machine itself need not load or manipulate Java® card CAP files; it need only execute the applet code found in the Java® card CAP file that was loaded onto the device by the installation program. The division of functionality between the Java® card virtual machine and the installation program keeps both the virtual machine and the installation program small. The installation program may be implemented as a Java® program and executed on top of the Java® card virtual machine. Since Java® card instructions are denser than typical machine code, this may reduce the size of the installer. The modularity may enable different installers to be used with a single Java® card virtual machine implementation.

It would be ideal if programs for chipcards could be written using all of the Java® programming language, but a full implementation of the Java® virtual machine is far too large to fit on even the most advanced resource-constrained devices available today. A typical resource-constrained device has on the order of 1K of RAM, 16K of non-volatile memory (EEPROM or flash) and 24K of ROM. The code for implementing string manipulation, single and double-precision floating point arithmetic, and thread management would be larger than the ROM space on such a device. Even if it could be made to fit, there would be no space left over for class libraries or application code. RAM resources are also very limited. Therefore Java® card technology is implemented as a subset of the Java® platform.

Dynamic class loading is for instance not supported in the Java® card platform. An implementation of the Java® card platform is not able to load classes dynamically. Classes are either masked into the card during manufacturing or downloaded through an installation process after the card has been issued. Programs executing on the card may only refer to classes that already exist on the card, since there is no way to download classes during the normal execution of application code.

Security management in the Java® card platform differs significantly from that of the Java® platform. In the Java® platform, there is a Security Manager class (java.lang.SecurityManager) responsible for implementing security features. In the Java® card platform, language security policies are implemented by the virtual machine. There is no Security Manager class that makes policy decisions on whether to allow operations.

In order to check at runtime that the Java® code has been successfully language verified, typically cryptographic methods are employed. This means that the actual deployer, after having performed a Java® language verification, signs the Java® code, i.e., the Java® card CAP file, in such a way that this cryptographic signature can be undeniably cryptographically verified within the embedded microcontroller system, i.e., a Java® virtual machine, that executes the Java® code. This way, the embedded microcontroller system does not need to do within its chip the complete Java® language verification, which, depending on the hardware capabilities of the embedded microcontroller, would either be a prohibitively expensive or a plainly intractable operation. Therefore, the deployer of the preprocessed Java® code establishes the trust in this Java® code by means of a Java® language verification before he signs the resultant file prior to loading it into the embedded microcontroller system.

The problem faced by the deployers of the preprocessed Java® code, e.g., Java® card CAP files, is that they no longer have access to the original Java® class files to be able to verify those themselves. As it is often, for example for copyright or IP reasons, also not an option to freely provide the Java® class files to the deployers of the Java® card CAP files, another solution for establishing the trust in the code contained in a Java® card CAP file needs to be found. One approach would be to develop a complete verifier operating on preprocessed code, e.g., on Java® card CAP files. However, this is a very labor-intensive approach not leveraging the maturity and experiences gained with PC-level Java® class verifiers.

SUMMARY OF THE INVENTION

The invention is directed to a method for language-verification of a Java® card CAP file, which has been converted from an original Java® code file under conservation of its original Java® semantics. In a conversion step the Java® CAP file is converted into a corresponding converted Java® code file that is semantically identical to the Java® card CAP file. In a language verification step, the converted Java® code file is then verified concerning its adherence to Java® language specifications. This advantageously provides that a standard tool for language verification can be used, more particularly the verification tool that can be used for language verifying the original Java® code file, even more particularly the Java® virtual machine. Furthermore the use of a known Java® language verification process exhibits the advantage that it has already been tested and corrected with view to programming errors and that the known process therefore exhibits a much lower number of possible errors than a new process for directly verifying Java card CAP files for their compliance with Java® card language rules would have. The invention relies on the experience that has made the language verification of an original Java® code file relatively secure and unproblematic.

The invention suggests that it is possible to reverse the conversion, i.e., the preprocessing step executed to arrive at a small Java® code format, in such a way that it is possible to make use of the existing language verifiers operating on the Java® class files. This way, deployers of preprocessed Java® code can independently of the developers of the original Java® code determine the trust one can put into the original Java® program.

In accordance with one aspect of the invention there is now provided a method for language verifying Java® card CAP files that can be executed on a Java® card, i.e., in a device with constrained resources. Constrained resources in this respect means not being able to host the code and processing power that is necessary to provide an on-board language verification. More precisely, the constrained resources do not allow evaluation of the so-called Descriptor Component, specified in the Java® card 2.1 VM Specification.

Viewing the present invention from another aspect, there is also provided a Java® card CAP file language verifier for language verifying Java® card CAP files that can be executed on a Java® card.

The Java® card CAP file language verifier comprises a converter for converting the Java® card CAP file into a corresponding converted Java® code file that is semantically identical to the Java® card CAP file, and a language verifier for language verifying the converted Java® code file.

Although the invention is primarily directed to how language verification can be accomplished for standard Java® card CAP files, its scope is not limited to Java® card CAP files, but it is also applicable to all scenarios where a reduced file that results from a conversion of an original file is to be language verified. The reduced file differs from the original file in that it results from a reduction operation, also called preprocessing or conversion, and is reduced in size.

The resulting CAP file contains internal references and the referenced items are named by tokens relative to this CAP file. The CAP file contains references to external libraries as well. Those external items are also named by tokens relative to packages. The export file contains the mappings of the tokens to the original symbolic names of the corresponding CAP file.

The method according to the invention essentially comprises a conversion step for converting the reduced file into a corresponding converted file that is semantically identical to the reduced file and a language-verification step for verifying the converted file. The language verification verifies whether the converted file is compliant to a predetermined language specification. In case of compliance the result of the language verification is positive and the entity having performed the language verification can create a signature to be attached to the reduced file. This signature, also referred to as second cryptographical signature file, can be cryptographically verified by an end user who can in the case of a positive result thereof execute the corresponding reduced file. Typically, the reduced file is smaller in size than the original file since the medium on which the reduced file is to be delivered is a device with reduced storage and processing capability, also referred to as a device with constrained resources. A mobile device like a chipcard is a typical example of a constrained resource device.

Viewing the present invention from yet another aspect, a language verifier is provided for a reduced file and a method for language verifying a reduced file.

BRIEF DESCRIPTION OF THE DRAWING

Examples of the invention are depicted in the drawing and described in detail below by way of example. FIG. 1 illustrates a schematic depiction of the steps according to the present invention.

DESCRIPTION OF THE PREFERRED EMBODIMENT

In the following, various exemplary embodiments of the invention are described. First, a description and explanation of the different involved file types is given.

Java® programs are represented in compiled, binary form as class files. Java® class files are used not only to execute programs on a Java® virtual machine, but also to provide type and name information to a Java® compiler. In the latter role, a class file is essentially used to document the API of its class to client code. That client code is compiled into its own class file, including symbolic references used to dynamically link to the API class at runtime. Java® card technology uses a different strategy for binary representation of programs. Executable binaries and interface binaries are represented in two separate files. These files are respectively called Java® card CAP files (for converted applet) and export files.

The Java® Class File Format

A standard Java® class file contains for its class descriptors, namely the class description and the executable instructions for that class in a parseable form. Thus, the Java® class file can be read sequentially and converted by a virtual machine at runtime into an executable form. The class description contains for instance information about its super class, its instance and static fields and about its methods and their executable instructions, i.e., the bytecode. Referenced items within the descriptors and within the bytecode are addressed by symbolic names (in UTF8 representation). This includes references to class-internal items as well as references to external items such as classes, fields and methods in external classes for instance in the system library which contains the calls for the operating system on the card. A standard Java® class file contains the information for only one class, whereas multiple classes—for instance of one Java® package—are typically bundled in a so-called jar file. Thus, the class name of a class includes the name of its package, i.e., java/lang/object, where java/lang is the package name of the class.

The Java® Card CAP File Format

A Java® card CAP file contains a binary representation of a package of classes that can be installed on a device and is used to execute the package's classes on a Java® card virtual machine. A Java® card CAP file is produced by a Java® card converter when a package of classes is converted. A Java® card CAP file can contain a user library, or one or more applet definitions. A Java® card CAP file consists of a set of components, each of which describes a different aspect of the contents. The set of components in a Java® card CAP file can vary, depending on whether the file contains a library or applet definition(s).

The JAR file format is used as the container format for Java® card CAP files. What this specification calls a "Java® card CAP file" is just a JAR file that contains the required set of Java® card CAP components. Java® card CAP component files in a JAR file are located in a subdirectory called javacard that is in a directory representing the package. For example, the Java® card CAP component files of the package com.sun.framework are located in the directory com/sun/framework/javacard. An export file may also be contained in a JAR file, whether that JAR file contains Java® card CAP component files or not. If an export file is included, it must be located in the same directory as the Java® card CAP component files for that package would be. Other files, including other Java® card CAP files, may also reside in a JAR file that contains Java® card CAP component files.

Each Java® card CAP file contains all of the classes and interfaces defined in one Java® package. Java® card converters must be capable of producing Java® card CAP files that conform to the specification provided in the Java® 2.1. specification. A Java® card CAP file consists of a stream of 8-bit bytes. To avoid confusion with the fields of Java® card virtual machine classes and class instances, the contents of the structures describing the Java® card CAP file format are referred to as items. Unlike the fields of a C structure, successive items are stored in the Java® card file sequentially, without padding or alignment.

A Java® card CAP file is suited to be run on a Java® card and covers a whole Java® package and is split into multiple sections. One section, the code section, contains a stripped down description of all classes of the Java® package suitable for the execution on the card and is optimized for a small size and a simple linking scheme on the card. Thus, this section is not intended to be parsed sequentially, but instead is read blockwise and easily adapted for the execution on the card. Other sections on the card, the code description sections, contain information about the classes, fields and methods stored in the Java® card CAP file, i.e., it tells where a class description or the bytecode for a method can be found and what the names and types of the individual classes, fields and methods are.

Thus, using the code description section, a Java® card CAP file can be parsed and the first part of the original class, method and field information can be built up. However, a Java® card CAP file does not contain symbolic references for internally or externally referenced items anymore. Instead, it uses short identifiers, also called tokens, for references which are resolved before execution, for instance:

packages are referenced by an AID, i.e., Application Identifier, 5 to 16 bytes long;

external classes are specified by the package in which they are defined and a short integer which the defining package has reserved for them;

internal classes are specified by their offset within the code section; and internal and external instance fields are specified by their class and their offset into an instance of this class.

Methods are similarly named, again by using indices, offsets etc. instead of symbolic information. However, symbolic names can be built from the various offsets and indices which do not contain the original symbolic names, but contain equivalent information suitable for a language-verification process, i.e.:

an AID may be converted to a legal Java package name e.g. by creating a symbol starting with "p" and appending the individual bytes of the AID as character;

a legal class name may be formed by taking its converted package name and appending the short identifier as character; and a legal Java® field name may created by creating a symbolic name starting with "f" and appending the Java® card field name, e.g., its offset.

If such a converted Java® card CAP file does not contain any references to external items, it can already be language verified by a standard Java® virtual machine. If it contains references to external items, the symbolic names referring to them can be mapped to the original symbolic names which can be easily done with the help of Java® card export files.

The Java® Card Export File Format

Export files are not used directly on a device that implements a Java® card virtual machine. However, the information in an export file is critical to the operation of the virtual machine on a device. An export file can be produced by a Java® card converter when a package is converted. This package's export file can be used later to convert another package that imports classes from the first package. Information in the export file is included in the Java® card CAP file of the second package, then is used on the device to link the contents of the second package to items imported from the first package. A Java® card export file contains the public interface information for an entire package of classes. This means that an export file only contains information about the public API of a package, and does not include information used to link classes within a package. The name of an export file is the last portion of the package specification followed by the extension '.exp'. For example, the name of the export file of the javacard.framework package must be framework.exp. Operating systems that impose limitations on file name lengths may transform an export file's name according to their own conventions.

A Java®card export file describes the mapping of class, field and method names to the identifiers used in the Java® card CAP files and is generated by the Java® card CAP file generator during the conversion step together with the Java® card CAP file itself. These export files are published in case of standardized API's, for instance the system classes. Whenever a Java® card application using the system classes is converted, the converter uses this export file to map the symbolic names in the original Java® class files to the identifiers described in the export file.

The export files can be used in the other direction as well. Instead of constructing symbolic names for referring to external items, the original names from the export file are placed in the resulting standard Java® class files. The names for only internally visible items are still constructed in the formerly described way.

The so-called Descriptor Component provides sufficient information to parse and verify all elements of the Java® card CAP file. It references, and therefore describes, elements in the Constant Pool Component, Class Component, Method Component, and Static Field Component. No components in the Java® card CAP file reference the Descriptor Component.

In FIG. 1, the scheme starting from an original Java® code file 10 and depicting the various stages and files in the process is shown. The original Java® code file 10 comprises a class description 11, also labeled CLD, and executable instructions 12, also labeled INS. The original Java® code file 10 can be verified for its Java® language compliance in an original language verification step E, using a first virtual machine 18. After the language verification, a first signature generator 14 is used to create a first cryptographic signature file 13. The first cryptographic signature file 13 is created only in case of a positive result of the original language verification step E and in that sense confirms the originality and correctness of the original Java® code file 10. Thereby, a user, reading and cryptographically verifying the first cryptographic signature file 13 can trust the original Java® code file 10, provided the user trusts the issuer of the first cryptographic signature file 13, which is the entity that created the first cryptographic signature file 13, The cryptographical verification can be performed with any known system like the private-public key system or a symmetric key system, whereby the key is available to the user, typically on the card 25.

For making the original Java® code file 10 executable on a mobile medium with constrained resources, such as a Java® card 25, the original Java® code file 10 is converted in an original conversion step D into a Java® card CAP file 20 which has reduced size with respect to the original Java® code file 10. This conversion is done with a Java® card CAP file generator 15. The resulting Java® card CAP file 20 comprises a code section 21, also labeled COD, and a code description section 22, also labeled CDE. A further result of the original conversion step D is a Java® export file 23, also labeled EXP, which contains essentially the information which is necessary to convert the Java® card CAP file 20 back into its original class file 10, whereby this back-conversion need not lead to the exact original class file 10 but to a semantically identical file. In the original conversion step D the Java® card CAP file contents, i.e., the code and code description sections 21, 22, are created in such a way that the original Java® semantics are conserved, e.g., changes, to the bytecodes and descriptors occur in such a way that the standard language verification rules still apply. This is for instance true for the Java® card 2.1 standard.

Also available together with the Java® card CAP file 20 may be the first cryptographic signature file 13. The recipient of the Java® card CAP file 20 may then simply put the Java® card CAP file 20 together with its first cryptographic signature file 13 on the card 25. However there are several reasons why this might not be possible or recommended. Since the first cryptographic signature file 13 only establishes trust in the original Java® class file 10, the user of the Java® card CAP file 20 on the Java® card 25 can not automatically trust the Java® card CAP file 20. The original conversion step D could have been performed by some untrusted entity delivering as the Java® card CAP file 20 some incorrect code. Also, a signature does per se not tell the user what tests the signing entity has performed. A language verification has not necessarily taken place. Hence, the user of the Java® card CAP file 20 is only safe when he can establish trust in the Java® card CAP file 20 itself. Therefore this Java® card CAP file 20 should be verified itself. Also a typical situation could be that the user has the Java® card CAP file 20 but not the original Java® class file 10. He might also not even have the first cryptographic signature file 13. The user wants to establish trust in the Java® card CAP file 20 and therefore needs a language-verification process. As user in this context is to be seen an entity that has the Java® card CAP file 20 and wants to load it to the card 25. This loading step shall be done including a signature that can be cryptographically verified and that to an end user of the card 25 signals that the Java® card CAP file 20 has been Java®-language verified.

The Java® card 25 has no space for hosting an on-card verifying tool like the Java® card Descriptor Component. So a direct on-card language verification of the Java® card CAP file 20 is not possible.

Verification of the Java® Card CAP File

A language verification of the Java® card CAP file 20 is made possible by the following method.

In a conversion step A, the Java® card CAP file 20 is converted into a converted Java® code file 40 which is semantically identical to the Java® card CAP file 20. Since the Java® card CAP file 20 is itself semantically identical to the original Java® class file 10, the original Java® class file 10 and the converted Java® code file 40 are semantically identical as well. Although during any of the conversion steps D, A some information gets lost, this is not relevant for the language-verification steps E, B.

Afterwards, a language-verification step B follows which can make use of a standard virtual machine as second virtual machine 19 for language verification. So the second virtual machine 19 is a verification virtual machine VVM, just as the first virtual machine 18 is also a verification virtual machine VVM. Again, only in case the language-verification step B leads to a positive result, a cryptographic signature file, here a second cryptographic signature file 43 is created in a signature step F and can be used to establish trust in the Java® card CAP file 20. For creating the second cryptographic signature file 43, a second signature generator 44 is used. Ideally, the second virtual machine 19 is identical in its functionality to the first virtual machine 18. The second virtual machine 19 according to the present technology can not be installed on the Java® card 25 itself, so the Java®-language verification is performed off card. The second cryptographic signature file 43 can then be attached to the Java® card CAP file 20. During a loading step for loading the Java® card CAP file 20 to the Java® card 25, the second cryptographic signature file 43 can be used in that a signature is calculated for the Java® card CAP file 20 and compared with the second cryptographic signature file 43. In case there is identity between the second cryptographic signature file 43 and the calculated signature, the Java® card CAP file 20 can be stored on the Java® card 25. The second cryptographic signature file 43 then can but need not be stored on the Java® card 25. On the Java® card 25 there is another virtual machine installed which is an executing virtual machine 24, labeled EVM and which can execute the Java® card CAP file 20.

The conversion step A can be split into two steps, a preconversion step A1 and a mapping step A2. The preconversion step A1 serves for converting Java® card IDs contained in the Java® card CAP file 20 into symbolic names, and for converting the Java® card CAP file 20 into a standard Java® format.

Optionally for the conversion step A, the Java® export file 23 can be used. The internal references in the Java® card CAP file 20 which are expressed in form of tokens can then be combined with the symbolic information stored in the Java® export file 23. Internal items can then be named by the tokens and the original symbolic names. This is better readable but in principle not necessary to obtain semantical identity.

A preconverted file 30 is thereby obtained. The preconverted file 30 itself contains a preconverted code section 31, also labeled COD', and a preconverted code description section 32, also labeled CDE'.

The mapping step A2, performed by a mapper 17, serves for replacing in the preconverted file 30 externally defined names with original names by using a mapping scheme between Java® names and tokenized identifiers, short tokens, to obtain the converted Java® code file 40 for the language-verification step B. This step is only necessary if such externally defined names are actually present in the preconverted file 30. The converted Java® code file 40 contains a converted class description 41, also labeled CLD', and a section with converted executable instructions 42, also labeled INS'.

The mapping step A2 is performed under use of a referenced Java® export file 26 which is available as a result from a conversion step in which a referenced Java® card CAP file has been converted from its original Java® code file. Whereas in the conversion step A only internal references have been resolved, in the mapping step external references are resolved. Such a reference can be directed to a different class file than the original class file 10. It is assumed that for that different class file, herein referred to as referenced class file, a corresponding Java® card CAP file, referred to as referenced Java® card CAP file, and a corresponding export file, referred to as referenced export file 26, are available. Hence for resolving a reference to such a referenced class file, present in the preconverted file 30, the corresponding referenced export file 26 is used in the mapping step A2. Thereby the external references are resolved and converted into symbolic external references. This is done with every referenced Java® export file 26 of a referenced class file that is referenced by the Java® card CAP file 20. All the external items, referenced in the Java® card CAP file 20, which are named by tokens so far, are hence associated with their original symbolic names.

The converted Java® code file 40 hence has all references converted into symbolic references.

Finally the preconverted class file 30 is converted into a standard class file by rearranging the individual code section, header section and link information so that they comply with the standard class file format. This is possible since all the former transformations from the original Java® class file 10 to the Java® card CAP file 20 did not change the semantics, but only the symbolic information has been replaced by tokens and the layout has been changed.

For the language-verification step B, the second virtual machine 19 accesses the referenced class files in order to perform the language verification. For each of the referenced class files two possibilities exist. First, they are system class files and hence directly accessible by the second virtual machine 19, or second they are non-system class files, also referred to as libraries. Those libraries are typically again accessible in form of their corresponding CAP files, also referred to as library CAP files. For those library CAP files, the proposed method of conversion is used recursively, i.e., the corresponding converted Java® code file for that library CAP file is generated and checked for references to other libraries. This is continued until the second virtual machine 19 arrives at a situation when all external references are to system classes only. Then the second virtual machine 19 has all information needed for language-verifying the converted Java® code file 40.

The language-verification step B leads to the creation of the second cryptographic signature file 43 when its result is positive. The Java® card CAP file 20 is joined with the second cryptographic signature file 43 and loaded to the card 25. An end user can now read the second cryptographic signature file 43 and cryptographically verify it. The Java® card CAP file 20 can be executed via the executing virtual machine 24, once trust has been established via the language-verification step B.

With the above described method, the problem of Java®-language verifying the Java® card CAP file 20 is reduced to the language verification of its underlying Java® class file 10, respectively the semantically identical converted Java® code file 40. This is easier than a direct Java®-card language verification of the Java® card CAP file 20 since the language-verification step B can make use of the same facility as the original language-verification step E has done. The virtual machine to be used therefore is already a well known and reliable tool. By this method the development of a direct Java®-card language verifier operating on the Java® card CAP file 20 is rendered obsolete.

In case of the Java® card 25, hence the executable content which is stored in the standardized Java® card format is converted into a file semantically identical to the Java® class file 20 in the standard Java® class file format which is used for the language verification by a standard Java® virtual machine, i.e., the second virtual machine 19.

DETAILED EXAMPLE

In the following, the original conversion step D and the conversion step A are shown for a part of the class information. Here, only considered is the information in a class regarding its name, the name of its super class and its fields. The remaining information for methods, etc., is however processed in an analogous manner.

The original Java® code file 10 in the standard class file format contains the following information regarding name, super class name and fields:
- the name is given in UTF8, e.g. symbolic;
- the name of the super class is given symbolic (UTF8); and
- a field contains its name (symbolic), type (symbolic), access rights (PUBLIC, PRIVATE, etc.).

During the conversion process to the Java® card CAP file 20 which here is a Java card 2.1 CAP file, the following process is carried out. The symbolic names are mapped to short identifiers and the information is split into three parts where two parts, the code description section 22 and the code section 21, are included in the Java® card 2.1 file, and the third part is separately stored as the Java® export file 23. The export file 23 contains the symbolic information for the class, its super class and the fields. It also contains the identifiers which are used for these names, classes and fields.

The Java® card CAP file 20 is basically split into two parts:
1. An execution component, which is the code section 21, with minimal class information, for instance the super class identifier) and the instructions; and
2. A description component, which is the code description section 22 contains the information where the individual classes can be found, the fields they have, etc. For instance, a class is specified by giving its identifier and an offset into the execution component where additional information can be found.

So the information can be gathered to reconstruct standard class files, i.e., to convert the Java® card CAP file 20 into the preconverted file 30. From the execution component 21 and the description component 22, one can get the total class information with the limitation that only short identifiers for the identification of fields, classes and methods are available. From the Java® export file 23, one can get the symbolic information for the identifiers. Then a standard class file, as is the converted Java® code file 40, can be constructed.

The generated standard class file, i.e., the converted Java® code file 40, is not the same as the original class file 10, but it is semantically equal to it. The Java® export file 23 contains only the symbolic names for public or protected elements, not for private elements. That means that in the original Java® code file 10 the name of a field could have been "MARCUS", but that information is not available after the original conversion step D anymore. Instead, the Java® card CAP file 20 will declare that field, but with a short identifier like "2". The regenerated standard class file, i.e., the converted Java® code file 40, will then declare the field name to be, for example, "f2". It will have the same type (integer, byte etc.). Thus, at execution time the regenerated standard class file, i.e., the converted Java® code file 40, will behave exactly the same as the original Java® code file 10. Method names and class names might have to be constructed like that as well, but again, no difference at execution time can be recognized.

The Java® card CAP file 20, i.e., the executable component which is the code section 21 and the descriptor component, which is the code description section 22, contains the information about its methods and their instructions. In theory the conversion step A could optimize the Java® code in such a way that the code in the regenerated standard class file 40 is not a valid Java® bytecode anymore and would be rejected by the standard Java® language verifier 19. However, Java® card CAP files 20 must be verifiable themselves and the rules applying for Java® card 2.1 bytecode are the same as for standard Java®. That also means that all Java® card 2.1 instruction conversions do not affect the properties as they are defined by standard Java®.

Generalization

Although the invention has been described in detail for the Java®language, it is applicable to other environments and languages which may be manipulated in a similar manner. A generic description of the process follows.

An original file 10 containing a description section 11 and an instruction section 12, written in a condensed interpreted language is converted into a reduced file 20, comprising a code section 21 and a code description section 22, while conserving of its language semantics. This reduced file is in the hands of an entity which does not have direct access to the original file 10 but wants to verify the reduced file 20 with respect to its compliance with the rules of the condensed interpreted language. For this language verification, the reduced file 20 is converted into a converted file 40, comprising a converted description section 41 and a converted instruction section 42. The converted file 40 is semantically identical to the original file 10, respectively to the reduced file 20. A loss of information during that step is accepted which does not influence the correctness and authenticity of the respective code and hence does not influence the result of the language verification itself. Finally, the converted file 40 is language verified. This can advantageously be done with the same or a similar tool with which a language verification of the original file 10 can be performed. In the case of a positive language verification result, the entity can create a second signature file 43 with which the reduced file 20 is signed. The reduced file 20 may then be loaded together with the second signature file 43 to a data carrier. This data carrier, also called storage device, can even be an environment 25 with constraint resources, which means that the reduced file 20 is not directly verifiable in that environment 25, e.g., a mobile device like a chipcard. The environment 25 can be taken by an end user who can cryptographically verify the second signature file 43 and upon a positive result thereof, provided there is trust in the entity that created the second signature file 43, trust the reduced file 20 and finally have it executed by the executing virtual machine.

The conversion step A for arriving from the reduced file 20 at the converted file 40 can be split into two substeps, namely the preconversion step A1 and the mapping step A2. The preconversion step A1 serves for converting IDs, i.e. names, contained in the reduced file 20 into symbolic names, and for converting the reduced file 20 into a standard format, to obtain a preconverted file 30, comprising a preconverted code section 31 and a preconverted code description section 32.

The mapping step A2 makes use of difference files 26 of those class files that are referenced by the reduced file 20. For the reduced file 20 itself, the difference file 23 exists and is besides the reduced file 20 another result of the original conversion step D and contains the information that is necessary to arrive from the reduced file 20 at the converted file 40, i.e., at a semantically identical file of the reduced file 20. This clearly means that difference file 23 together with the reduced file 20 not automatically contains the exact information that is contained in the original file 10, as long as semantical identity is guaranteed. The difference file 23 can but need not be used for converting internal references to symbolic references in the preconversion step A1.

The difference files 26 pertaining to referenced class files are hence used in the mapping step A2 to convert the external references in the reduced file 20, respectively in the preconverted file 30 to symbolic references.

In other words, the mapping step A2 serves for replacing in the preconverted file 30 externally defined names with original names under use of a mapping scheme, to obtain the converted file 40. The mapping scheme consists of the mapping between the tokens, i.e., names, and their corresponding symbolic references. This mapping scheme is obtained by looking into the referenced difference files 26, i.e., difference files 26 pertaining to referenced class files. In the case externally defined names are not present in the preconverted file 30, the mapping step is not needed.

The language verification step B uses as input the converted file 40 and for each reference to external items looks for these items. In the case such an item is a system file, this file is available and can be used directly in the language-verification step B. In case the item is itself an original file which is not available per se but only in form of a reduced file, the reduced file can be converted with the herein proposed method to its converted file and the therein referenced items are looked at. Again, external items are either system files or reduced files which can be converted. This is recursively repeated until finally only available system files or original files are referenced. Then the language-verification step B has access to all information needed. In case of a positive verification result, a signature file 43 can be created and attached to the reduced file 20.

It is obvious to the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system, or other apparatus adapted for carrying out the methods described herein, is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system, is able to carry out these methods.

Computer program means or computer program in the present context mean any expression, in any language, code or notation, of a set of instructions intended to cause a system having an information processing capability to perform a particular function either directly or after either or both of conversion to another language, code or notation and/or reproduction in a different material form.

Any disclosed embodiment may be combined with one or several of the other embodiments shown and/or described. This is also possible for one or more features of the embodiments. It is obvious that a person skilled in the art can modify the shown arrangements in many ways without departing from the gist of the invention which is encompassed by the subsequent claims.

The invention claimed is:

1. A computer-implemented method of verifying that a reduced set of code adheres to a pre-defined language syntax before being stored in a smart card, the computer-implemented method comprising:
    determining if an original full-version code file complies with a pre-defined language syntax, wherein the original full-version code file is capable of executing all instructions and utilizing all features found in a full version of a programming language;
    in response to determining that the original full-version code file complies with the pre-defined language syntax, creating a first cryptographic signature for the original full-version code file;
    storing the first cryptographic signature on a smart card, wherein the smart card comprises a limited-capacity embedded microcontroller;
    converting the original full-version code file into a reduced-version code file, wherein the reduced-version code file is capable of executing only a limited subset of instructions and features found in the full version of the programming language;
    converting the reduced-version code file into a converted file, wherein the converted file is capable of utilizing all features found in the full version of the programming language, and wherein converting the reduced-version code file into the converted file is performed by a pre-conversion step, a mapping step, and a final conversion step,
    wherein the pre-conversion step includes:
        converting the reduced-version code file into a preconverted file, wherein the preconverted file utilizes the pre-defined language syntax, and
        wherein the preconverted file includes a preconverted code section and a preconverted code description section, and
    wherein the mapping step includes:
        utilizing a mapper to replace, in the preconverted file, externally defined names in the reduced-version code file with original names that are used in the full-version code file, wherein the mapper utilizes an export file that was created during the pre-conversion step, and wherein external references found in the preconverted file are resolved and converted into symbolic external reference for every class file that is referenced by the reduced-version code file, and
    wherein the final conversion step includes:
        converting the preconverted file into the converted file by rearranging individual code sections, header sections and link information so that they comply with the pre-defined language syntax, wherein the converted file includes a converted class description and converted executable instructions that are respectively derived from the preconverted code section and the preconverted code description section in the preconverted file;
    in response to determining that the converted file complies with the pre-defined language syntax, creating a second cryptographic signature for the converted file;
    storing the second cryptographic signature on the smart card; and
    in response to the first cryptographic signature matching the second cryptographic signature, storing the reduced-version code file on the smart card, wherein the first cryptographic signature and the second cryptographic signature match only if the original full-version code file, the reduced-version code file, the preconverted file, and the converted file all comply with the pre-defined language syntax.

2. The computer-implemented method of claim 1, wherein the converted file contains a different class file than the original full-version code file, but wherein the converted file and the original full-version code file are semantically identical according to syntax rules set by the pre-defined language syntax.

3. The computer-implemented method of claim 2, wherein creating and comparing the first cryptographic signature and the second cryptographic signature are performed outside the smart card.

4. A tangible computer-readable medium on which is stored a computer program code, the computer program code comprising computer executable instructions configured for verifying that a reduced set of code adheres to a pre-defined language syntax before being loaded onto a smart card, and wherein the computer executable instructions, when executed, perform the steps of:
    determining if an original full-version code file complies with a pre-defined language syntax, wherein the original full-version code file is capable of executing all instructions and utilizing all features found in a full version of a programming language;

in response to determining that the original full-version code file complies with the pre-defined language syntax, creating a first cryptographic signature for the original full-version code file;

storing the first cryptographic signature on a smart card, wherein the smart card comprises a limited-capacity embedded microcontroller;

converting the original full-version code file into a reduced-version code file, wherein the reduced-version code file is capable of executing only a limited subset of instructions and features found in the full version of the programming language;

converting the reduced-version code file into a converted file, wherein the converted file is capable of utilizing all features found in the full version of the programming language, and wherein converting the reduced-version code file into the converted file is performed by a pre-conversion step, a mapping step, and a final conversion step, wherein the pre-conversion step includes:
  converting the reduced-version code file into a preconverted file, wherein the preconverted file utilizes the pre-defined language syntax, and
  wherein the preconverted file includes a preconverted code section and a preconverted code description section, and wherein the mapping step includes:
  utilizing a mapper to replace, in the preconverted file, externally defined names in the reduced-version code file with original names that are used in the full-version code file, wherein the mapper utilizes an export file that was created during the pre-conversion step, and wherein external references found in the preconverted file are resolved and converted into symbolic external reference for every class file that is referenced by the reduced-version code file, and wherein the final conversion step includes:
  converting the preconverted file into the converted file by rearranging individual code sections, header sections and link information so that they comply with the pre-defined language syntax, wherein the converted file includes a converted class description and converted executable instructions that are respectively derived from the preconverted code section and the preconverted code description section in the preconverted file;

in response to determining that the converted file complies with the pre-defined language syntax, creating a second cryptographic signature for the converted file;

storing the second cryptographic signature on the smart card; and in response to the first cryptographic signature matching the second cryptographic signature, storing the reduced-version code file on the smart card, wherein the first cryptographic signature and the second cryptographic signature match only if the original full-version code file, the reduced-version code file and the converted file comply with the pre-defined language syntax.

5. The tangible computer-readable medium of claim 4, wherein the converted file contains a different class file than the original full-version code file, but wherein the converted file and the original full-version code file are semantically identical according to syntax rules set by the pre-defined language syntax.

6. The tangible computer-readable medium of claim 5, wherein creating and comparing the first cryptographic signature and the second cryptographic signature are performed outside the smart card.

7. A computer system comprising a tangible computer-readable medium on which is stored a computer program code, the computer program code comprising computer executable instructions configured for verifying that a reduced set of code adheres to a pre-defined language syntax before being loaded onto a smart card, and wherein the computer executable instructions, when executed, perform the steps of:

determining if an original full-version code file complies with a pre-defined language syntax, wherein the original full-version code file is capable of executing all instructions and utilizing all features found in a full version of a programming language;

in response to determining that the original full-version code file complies with the pre-defined language syntax, creating a first cryptographic signature for the original full-version code file;

storing the first cryptographic signature on a smart card, wherein the smart card comprises a limited-capacity embedded microcontroller;

converting the original full-version code file into a reduced-version code file, wherein the reduced-version code file is capable of executing only a limited subset of instructions and features found in the full version of the programming language;

converting the reduced-version code file into a converted file, wherein the converted file is capable of utilizing all features found in the full version of the programming language, and wherein converting the reduced-version code file into the converted file is performed by a pre-conversion step, a mapping step, and a final conversion step, wherein the pre-conversion step includes:
  converting the reduced-version code file into a preconverted file, wherein the preconverted file utilizes the pre-defined language syntax, and
  wherein the preconverted file includes a preconverted code section and a preconverted code description section, and wherein the mapping step includes:
  utilizing a mapper to replace, in the preconverted file, externally defined names in the reduced-version code file with original names that are used in the full-version code file, wherein the mapper utilizes an export file that was created during the pre-conversion step, and wherein external references found in the preconverted file are resolved and converted into symbolic external reference for every class file that is referenced by the reduced-version code file, and wherein the final conversion step includes:
  converting the preconverted file into the converted file by rearranging individual code sections, header sections and link information so that they comply with the pre-defined language syntax, wherein the converted file includes a converted class description and converted executable instructions that are respectively derived from the preconverted code section and the preconverted code description section in the preconverted file;

in response to determining that the converted file complies with the pre-defined language syntax, creating a second cryptographic signature for the converted file;

storing the second cryptographic signature on the smart card; and in response to the first cryptographic signature matching the second cryptographic signature, storing the reduced-version code file on the smart card, wherein the first cryptographic signature and the second cryptographic signature match only if the original full-version code file, the reduced-version code file and the converted file comply with the pre-defined language syntax.

8. The computer system of claim 7, wherein the converted file contains a different class file than the original full-version code file, but wherein the converted file and the original full-version code file are semantically identical according to syntax rules set by the pre-defined language syntax.

9. The computer system of claim 8, wherein creating and comparing the first cryptographic signature and the second cryptographic signature are performed outside the smart card.

* * * * *